July 1, 1952  C. V. RIDDELL ET AL  2,601,766

FOOD HANDLING DEVICE

Filed April 9, 1948

INVENTOR.
Clarence V. Riddell
BY Charles A. Niedrach, Jr.

McMorrow, Berman + Davidson
ATTORNEYS

Patented July 1, 1952

2,601,766

UNITED STATES PATENT OFFICE 2,601,766

FOOD HANDLING DEVICE

Clarence V. Riddell, Belmar, and Charles A. Niedrach, Avon, N. J.

Application April 9, 1948, Serial No. 20,068

5 Claims. (Cl. 65—12)

This invention relates to an improved device for handling food articles during the cooking or other treatment thereof, the primary object of the invention being to provide a device of this kind, especially although not exclusively, facilitating the grilling of frankfurters, which comprises rolling them on the grill puncturing their skins to accelerate their cooking, and placing and removing the frankfurters from the grill, all without contact with the hands of the cook.

Another important object of the invention is the provision of a simple, inexpensive, light weight, and easily manipulable device of the above indicated character which combines in itself instrumentalities for performing all of the above mentioned functions, said instrumentalities being so arranged with respect to each other that any function may be performed without changing the position of the device in the hand, so that these and similar functions can be rapidly and efficiently performed without fatigue.

Other important objects and advantageous features of the invention will be apparent from the following description and accompanying drawings, wherein merely for purposes of illustration herein, a specific embodiment of the invention is set forth in detail.

Figure 1:
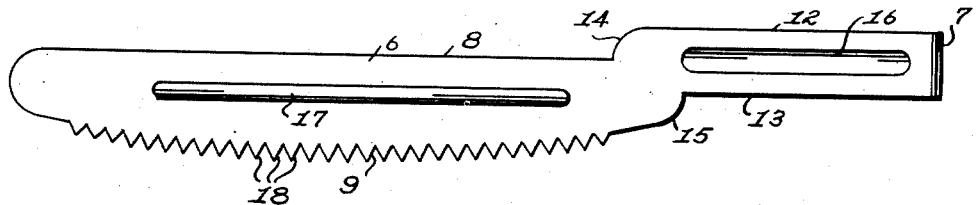
Figure 1 is a side elevation of the device.

Referring in detail to the drawing, the numeral 5 generally designates the illustrated device, which is in the general form of a tongs formed preferably although not necessarily, from a single length of sheet spring metal, to provide two similar blades 6, 6 connected at one end by a U-shaped handle 7.

Each blade 6 has a straight upper edge 8, approximately 9½ inches long, and a curved lower edge 9, which curves downwardly from each end of the blade toward the midpoint thereof, giving the blade a maximum depth of about 1⅜ inches at the midpoint and a minimum depth of 1 inch at each end. The curved lower edge 9 is longer than the upper edge 8, having an approximate length of 10½ inches.

Figure 3:
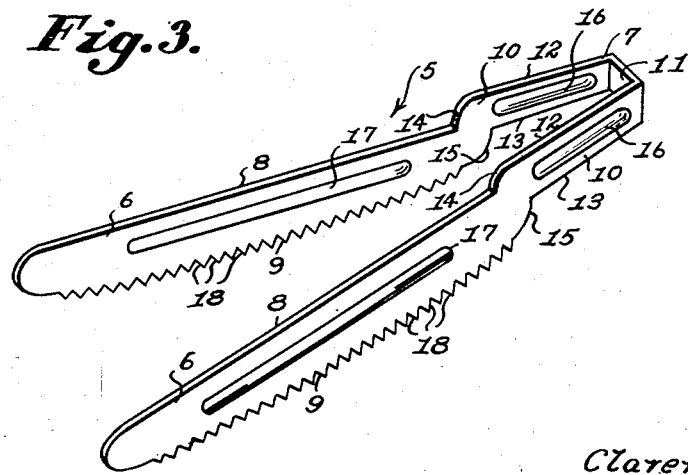
Figure 3 is a perspective view showing the device in normal expanded position.

The U-shaped handle 7 comprises parallel edged sides 10, 10 of about 1 inch width, connected at their rear ends by a web 11 about 1¼ inches long. The upper edges 12, 12 of the sides 10, 10 are longer than the lower edges 13, 13 being about 5 inches long as compared to a length of 4 inches for the lower edges. As shown in Figures 1 and 3 the handle 7 is upwardly offset above ½ inch above the blades 6, 6 in a plane parallel to the upper blade edges 8, 8 so that the fingers of the cook will be out of contact with the grill when the handle 7 is grasped and the device manipulated to perform the functions described hereinabove.

The forward ends of the handle sides 10, 10 are rounded at 14, 14 where they merge into the rear ends of the blades 6, 6 and the rear ends of the blades are rounded at 15, 15 where they merge with the lower edges 13, 13 of the handle sides, providing comfortable hand contact therewith. The handle sides have longitudinal inward indentations 16, 16 providing better grip for the fingers and adding strength and rigidity to these portions of the handle 7. Similar reinforcing outward indentations 17, 17 are provided in the blades 6, 6.

The curved lower edges 9, 9 of the blades are formed with triangular teeth 18 designed to pierce the skins of frankfurters when applied thereto, and providing a sure grip upon the frankfurters when rolling the same on a grill with the aid of the device.

Figure 2:
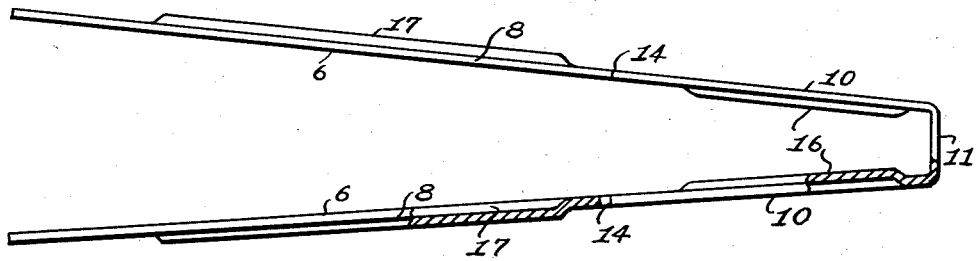
Figure 2 is a top plan view partly in section.

The blades 6, 6 are normally tensioned away from each other by the handle 7, so that they occupy divergent positions, as shown in Figures 2 and 3, the sides of the handle being adapted to be compressed toward each other to contract the blades 6, 6 toward each other for grasping and carrying a frankfurter therebetween.

It will be understood that the measurements set forth above for the different components of the device are given solely to clarify the construction of the device and may be varied within relatively wide limits without departing from the essential nature of the device.

With the described device grasped in the hand by the handle 7, the device may be used to place a frankfurter on the grill by compressing the handle so as to grip opposite sides of the frankfurter with the blades 6. With the frankfurter deposited on the grill the same may be rolled to desired position by applying the lower edges of the blades crosswise of the upper surface of the frankfurter and pushing or pulling in a direction lengthwise of the device. While so rolling a frankfurter sufficient pressure may be exerted to force the teeth 18 to puncture the skin of the frankfurter, as is commonly done to accelerate the cooking thereof.

What is claimed:

1. In a device for rolling and puncturing a frankfurter, a resilient handle portion involving a bight portion and two laterally spaced legs, longitudinally elongated extensions on the ends of said legs remote from said bight portion, said extensions having lower edges which are upwardly curved from the middle toward both ends of said extensions, said lower edges being serrated to provide non-cutting teeth therealong having points, the serrated and curved lower edges of said extensions being arranged to be engaged with and moved crosswise of the top of a frankfurter on a grill in one or in opposite directions so as to roll the frankfurter on the grill in corresponding directions and cause the points of said teeth to puncture the frankfurter.

2. In a device for rolling and puncturing a frankfurter, a resilient handle portion involving a bight portion and two laterally spaced legs, longitudinally elongated extensions on the ends of said legs remote from said bight portion, said extensions having lower edges which are upwardly curved from the middle toward both ends of said extensions, said lower edges being serrated to provide non-cutting teeth therealong having points, the serrated and curved lower edges of said extensions being arranged to be engaged with and moved crosswise of the top of a frankfurter on a grill in one or in opposite directions so as to roll the frankfurter on the grill in corresponding directions and cause the points of said teeth to puncture the frankfurter, said handle legs being flexible toward each other in order to reduce the spacing of said extensions with respect to each other and thereby provide for engagement of the toothed lower edges of the extensions with the frankfurter at lesser distances apart.

3. In a device for rolling and puncturing a frankfurter, a resilient handle portion involving a bight portion and two laterally spaced legs, longitudinally elongated extensions on the ends of said legs remote from said bight portion, said extensions having lower edges which are upwardly curved from the middle toward both ends of said extensions, said lower edges being serrated to provide non-cutting teeth therealong having points, the serrated and curved lower edges of said extensions being arranged to be moved longitudinally across the top of a frankfurter on a grill in one or in opposite directions so as to roll the frankfurter on the grill in corresponding directions and cause the points of said teeth to puncture the frankfurter, said extensions being downwardly offset with respect to said handle legs.

4. In a device for rolling and puncturing a frankfurter, a resilient U-shaped handle portion involving a bight portion and two laterally spaced, longitudinally elongated legs, said legs being tensioned away from each other to normally be in divergent relation to each other, and to be compressible toward each other to vary the spacing of the legs from each other, the ends of the legs remote from said bight portion terminating in two flat blades elongated in the direction of the length of said legs and positioned in the planes of said legs, said blades having longitudinal edges curved convexly from a point intermediate the ends of the blades to both ends of the blades, said curved edges being serrated to form non-cutting teeth having points, the curved edges of the blades being arranged to be engaged with and moved crosswise of the top of a frankfurter to roll the frankfurter on a surface and cause the teeth points to puncture the frankfurter, at two points spaced along the length of the frankfurter determined by the spacing of the said legs from each other.

5. In a device for rolling and puncturing a frankfurter, a resilient U-shaped handle portion involving a bight portion and two laterally spaced, longitudinally elongated legs, said legs being tensioned away from each other to normally be in divergent relation to each other, and to be compressible toward each other to vary the spacing of the legs from each other, the ends of the legs remote from said bight portion terminating in two flat blades elongated in the direction of the length of said legs and positioned in the planes of said legs, said blades having longitudinal edges curved convexly from a point intermediate the ends of the blades to both ends of the blades, said curved edges being serrated to form non-cutting teeth having points, the curved edges of the blades being arranged to be engaged with and moved crosswise of the top of a frankfurter to roll the frankfurter on a surface and cause the teeth points to puncture the frankfurter, at two points spaced along the length of the frankfurter determined by the spacing of the said legs from each other, said blades being wider than said legs and offset with respect to one longitudinal edge of said legs with the curved edges of the blades positioned laterally outwardly from the said one longitudinal edge of the legs.

CLARENCE V. RIDDELL.
CHARLES A. NIEDRACH.

REFERENCES CITED

The following references are of record in the file of this patent:

UNITED STATES PATENTS

| Number | Name | Date |
|---|---|---|
| 165,841 | Kellogg | July 20, 1875 |
| 437,325 | Barclay | Sept. 30, 1890 |
| 460,677 | Christy | Oct. 6, 1891 |
| 557,188 | Capewell | Mar. 31, 1896 |
| 726,697 | Kelley | Apr. 28, 1903 |
| 778,904 | Seffens | Jan. 3, 1905 |
| 1,040,138 | Buck | Oct. 1, 1912 |
| 1,205,871 | Dwyer | Nov. 21, 1916 |
| 1,362,143 | Rohrer | Dec. 14, 1920 |
| 1,424,722 | Hartleb | Aug. 1, 1922 |
| 1,492,134 | Kyle | Apr. 29, 1924 |
| 1,540,694 | Herrick | June 2, 1925 |
| 2,201,566 | Voelker | May 21, 1940 |
| 2,444,116 | Rossi | June 29, 1948 |

FOREIGN PATENTS

| Number | Country | Date |
|---|---|---|
| 48,442 | Norway | Sept. 22, 1930 |